United States Patent
He

(10) Patent No.: US 10,079,455 B2
(45) Date of Patent: Sep. 18, 2018

(54) SMART SWITCHING CHARGER AND POWER CONNECTION DEVICE THEREOF

(71) Applicant: Guangdong BESTEK E-commerce Co., Ltd., Shenzhen (CN)

(72) Inventor: Wei He, Shenzhen (CN)

(73) Assignee: Guangdong BESTEK E-commerce Co., Ltd., Shenzhen (CN)

( * ) Notice: Subject to any disclaimer, the term of this patent is extended or adjusted under 35 U.S.C. 154(b) by 0 days.

(21) Appl. No.: 15/640,593

(22) Filed: Jul. 3, 2017

(65) Prior Publication Data
US 2017/0365952 A1    Dec. 21, 2017

Related U.S. Application Data

(63) Continuation of application No. PCT/CN2016/103674, filed on Oct. 28, 2016.

(30) Foreign Application Priority Data

Jun. 8, 2016    (CN) .......................... 2016 1 0404464

(51) Int. Cl.
*H01R 13/62* (2006.01)
*H01R 24/28* (2011.01)
(Continued)

(52) U.S. Cl.
CPC .............. *H01R 13/64* (2013.01); *H01R 13/24* (2013.01); *H01R 13/6205* (2013.01);
(Continued)

(58) Field of Classification Search
CPC .... H01R 13/6205; H01R 24/28; H01R 27/02; H02J 7/0052
See application file for complete search history.

(56) References Cited

U.S. PATENT DOCUMENTS 7,311,526 B2 * 12/2007 Rohrbach .......... H01R 13/6205
                                                     439/218
7,845,974 B2 * 12/2010 Yue ...................... H01R 25/003
                                                     191/12.4
(Continued)

FOREIGN PATENT DOCUMENTS

CN        104242002 A     9/2014
CN        204179354 U     2/2015
(Continued)

*Primary Examiner* — Briggitte R Hammond

(57) ABSTRACT

A smart switching charger and a power connection device thereof are disclosed. The smart switching charger includes a socket a plug and a DC power line. The socket is mounted to a power device to acquire electricity therefrom and includes a first contact group. The plug includes a second contact group corresponding to the first contact group. At least one of the first and second contact groups is magnetic to the first contact group attracting to the second contact group. When the first contact group attracts to the second contact group, the plug acquires electricity from the socket. The DC power line connects with the plug for transmitting electricity to electrical devices. Such configuration may obtain a reliable electrical connection between the socket and the plug through magnetic adsorption. A simple and convenient operation of connecting the socket and the plug is obtained, and lifespan of the charger is improved.

18 Claims, 5 Drawing Sheets

(51) Int. Cl.
*H01R 13/64* (2006.01)
*H01R 27/02* (2006.01)
*H02J 7/00* (2006.01)
*H01R 13/24* (2006.01)
*H01R 105/00* (2006.01)

(52) U.S. Cl.
CPC ............ *H01R 24/28* (2013.01); *H01R 27/02* (2013.01); *H02J 7/0042* (2013.01); *H02J 7/0052* (2013.01); *H01R 2105/00* (2013.01)

(56) References Cited

U.S. PATENT DOCUMENTS

| | | | | |
|---|---|---|---|---|
| 8,696,366 | B2* | 4/2014 | Chen | H01R 11/30 439/39 |
| 8,894,419 | B1* | 11/2014 | Buelow | H01R 13/6205 439/218 |
| 9,088,097 | B2* | 7/2015 | Kim | H01R 13/6205 |
| 2007/0259536 | A1* | 11/2007 | Long | H01R 13/6205 439/39 |
| 2010/0136801 | A1* | 6/2010 | Limpkin | G02B 6/3817 439/39 |
| 2011/0143556 | A1* | 6/2011 | Hsu | H01F 38/14 439/39 |
| 2013/0005159 | A1* | 1/2013 | Gao | H01R 13/17 439/39 |
| 2013/0295782 | A1* | 11/2013 | Goel | H01R 13/703 439/40 |
| 2015/0077064 | A1 | 3/2015 | Buelow | |

FOREIGN PATENT DOCUMENTS

| | | |
|---|---|---|
| CN | 204517039 U | 7/2015 |
| CN | 105140702 A | 9/2015 |
| CN | 105896139 A | 8/2016 |

* cited by examiner

SMART SWITCHING CHARGER AND POWER CONNECTION DEVICE THEREOF

CROSS-REFERENCE TO RELATED APPLICATION

The present application is a continuation of PCT Application NO. PCT/CN 2016/103674, filed on Oct. 28, 2016, which is incorporated by reference in its entirety.

BACKGROUND

Technical Field

The present disclosure generally relates chargers field, and especially relates to a smart switching charger and a power connection device thereof.

Description of Related Art

The electrical technology industry is developing and growing with a surprising speed, products around us also gradually come with electronic form, and consumers may now enjoy the fill convenience of high technology with the humanization use almost anytime and anywhere.

Nowadays, all kinds of different types of electrical devices such as mobile phones, laptops, and smart wearable devices are increasing in our daily life. Most electrical devices are usually equipped with a corresponding power adapter that may be connected with the electrical device by a corresponding data line for charging the electrical device. Furthermore, in addition to the power adapter, the electrical device may be connected to a USB port of a laptop or a power outlet via the data line to be charged.

Whether it's a power adapter, a laptop or a power outlet, it's charging for the electrical device through connecting its USB port to the USB plug of the data line. As is known to all, the USB plug must be aligned with the USB port in order to obtain a reliable connection therebetween, and differentiate the positive and negative directions before inserting the USB plug into the USB port. So, the operation for users is very fussy.

Additionally, such type insertion may easily cause poor connection between the USB plug of the data line and the USB port, even damage the USB plug of the data line or the USB-3 port, due to the influential factors such as the strength, angle or frequency of insertion, etc.

SUMMARY

The disclosure relates to a smart switching charger which, in a way, may solve at least one technology problem provided in the related art above.

The disclosure relates to a power connection device with the smart switching charger above mentioned which may provide an accurate and reliable electrical connection and greatly improve lifespan.

In one aspect, the smart switching charger according to an exemplary embodiment of the present disclosure includes a socket, a plug and a DC power line. The socket is assembled to a power device to acquire electricity from the power device and includes a first contact group. The plug includes a second contact group corresponding to the first contact group. At least one of the first and second contact groups is magnetic so that the first contact group may attract to the second contact group. The plug acquires the electrical energy transmitted from the socket when the first contact group attracts to the second contact group. The DC power line connects with the plug for transmitting the electrical energy to an electrical device.

Furthermore, the smart switching charger according to the embodiment of the disclosure may have the following technical features:

Wherein the socket includes a first housing defining a top surface, the first contact group is formed on the top surface, the plug includes a second housing defining a bottom surface matched with the top surface, the second contact group is formed on the bottom surface.

Wherein both the top surface and the bottom surface are plane.

Wherein the first contact group is lower than the top surface, and the second contact group is higher than the bottom surface.

Wherein the first contact group includes a first positive contact and at least two first negative contacts formed around the first positive contact; the second contact group includes a second positive contact attracting to the first positive contact, and at least two second negative contacts respectively attracting to the corresponding at least two first negative contacts, the at least two second negative contacts are formed around the second positive contact.

Wherein the amount of the first negative contact is two, the two first negative contacts are symmetrically arranged on two opposite sides of the first positive contact; while the amount of the second negative contact is two, the two second negative contacts are symmetrically arranged on two opposite sides of the second positive contact.

Wherein the first positive contact includes a first magnetic piece embedded in the socket and a first positive pad covered around the first magnetic piece; the first negative contact includes a second magnetic piece embedded in the socket and a first negative pad covered around the second magnetic piece. While the second positive contact includes a third magnetic piece embedded in the plug and a second positive pad covered around the third magnetic piece; the second negative contact includes a fourth magnetic piece embedded in the plug and a second negative pad covered around the fourth magnetic piece.

Wherein the DC power line includes a body and a power plug, one end of the body connects to the plug and the other end of the body connects to the power plug, the power plug connects with a charging port of the electrical device.

Wherein the first contact group and/or the second contact group are elastic elements.

In another aspect, a power connection device according to an exemplary embodiment of the present disclosure includes a power device configured for converting alternating current to direct current, and a smart switching charger. The smart switching charger includes a socket, a plug and a DC power line. The socket is assembled to a power device to acquire electricity from the power device and includes a first contact group. The plug includes a second contact group corresponding to the first contact group. At least one of the first and second contact groups is magnetic so that the first contact group may attract to the second contact group. The plug acquires the electrical energy transmitted from the socket when the first contact group attracts to the second contact group. The DC power line connects with the plug for transmitting the electrical energy to an electrical device.

Wherein the socket includes a first housing defining a top surface, the first contact group is formed on the top surface, the plug includes a second housing defining a bottom surface matched with the top surface, the second contact group is formed on the bottom surface.

Wherein both the top surface and the bottom surface are plane.

Wherein the first contact group is lower than the top surface, and the second contact group is higher than the bottom surface.

Wherein the first contact group includes a first positive contact and at least two first negative contacts formed around the first positive contact; the second contact group includes a second positive contact attracting to the first positive contact, and at least two second negative contacts respectively attracting to the corresponding at least two first negative contacts, the at least two second negative contacts are formed around the second positive contact.

Wherein the amount of the first negative contact is two, the two first negative contacts are symmetrically arranged on two opposite sides of the first positive contact; while the amount of the second negative contact is two, the two second negative contacts are symmetrically arranged on two opposite sides of the second positive contact.

Wherein the first positive contact includes a first magnetic piece embedded in the socket and a first positive pad covered around the first magnetic piece; the first negative contact includes a second magnetic piece embedded in the socket and a first negative pad covered around the second magnetic piece. The second positive contact includes a third magnetic piece embedded in the plug and a second positive pad covered around the third magnetic piece; the second negative contact includes a fourth magnetic piece embedded in the plug and a second negative pad covered around the fourth magnetic piece.

Wherein the DC power line includes a body and a power plug, one end of the body connects to the plug and the other end of the body connects to the power plug, the power plug connects with a charging port of the electrical device.

Wherein the first contact group and/or the second contact group are elastic elements.

The present disclosure provides the advantages as below.

The smart switching charger according to the embodiment of the present disclosure, the socket includes the first contact group and the plug includes the second contact group for attracting the corresponding first contact group, the plug acquires the electrical energy transmitted from the socket when the first contact group attracts to the second contact group. Thus, during use of the smart switching charger, the second contact group of the plug attracts to the first contact group of the socket, and then the DC power line is connected with the electrical device for charging the electrical device. Such configuration may obtain a reliable electrical connection between the socket and the plug via the magnetic adsorption. A simple and convenient operation of connecting the socket and the plug is obtained, and lifespan of the smart switching charger is improved.

Figure 1:
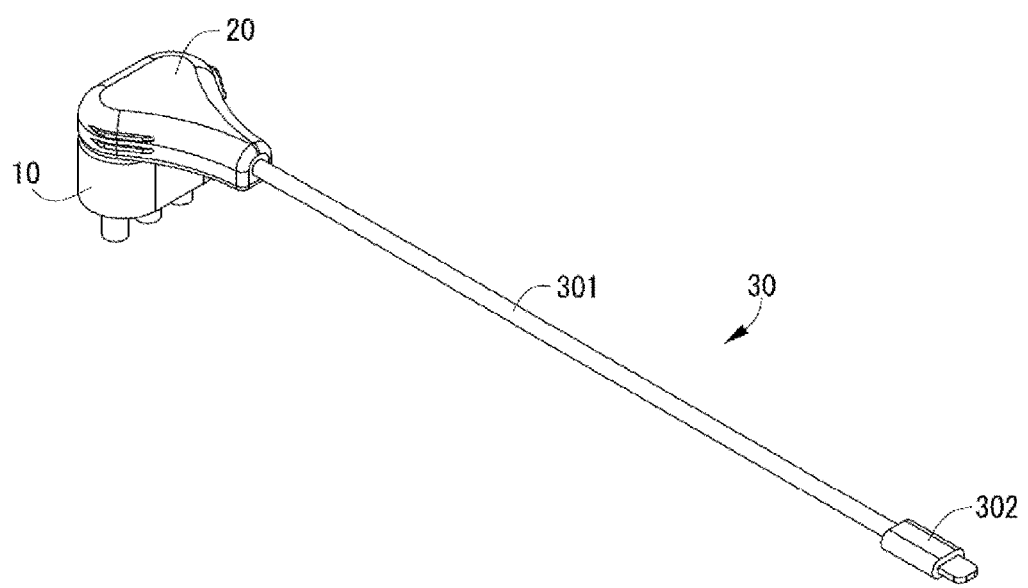
FIG. 1 is a schematic view of a smart switching charger in accordance with an exemplary embodiment.

The element labels according to the exemplary embodiment of the present disclosure shown as below:

socket 10, first housing 100, top surface 101, first contact group 11, first positive contact 111, first magnetic piece 1110, first positive pad 1111, first negative contact 112, second magnetic piece 1120, first negative pad 1121, plug 20, second housing 200, bottom surface 201, second contact group 21, second positive contact 211, third magnetic piece 2110, second positive pad 2111, second negative contact 212, fourth magnetic piece 2120, second negative pad 2121, DC power line 30, body 301, power plug 302, power device 300, electrical device 400.

DETAILED DESCRIPTION

The disclosure is illustrated by way of example and not by way of limitation in the figures of the accompanying drawings, in which like reference numerals indicate similar elements.

In the description of the present disclosure, it needs to be understood that the terms mentioned below: "centrality", "longitudinal", "transverse", "length", "width", "thickness", "upper", "below", "front", "back", "left", "right", "vertical", "horizontal", "top", "bottom", "inner", "outer", "clockwise", "anticlockwise", etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

In addition, the tens such as "first" and "second" shown in the specification are only used to describe, but not indicated that the elements of the present disclosure is important or represented the amount of the elements. That is, the features limited by the terms of "first" and "second" may explicitly or implicitly include one or more features. In the description of the present disclosure, the meaning of the term "multiple" is not less than two unless it is specifically illustrated.

In the present disclosure, except where specifically otherwise illustrated or limited, the terms "install", "connect", "link" and "fix" used herein should be understood in a broad sense. Such as, the meaning may be fixedly connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

Referring to FIGS. 1-5, the smart switching charger according to an exemplary embodiment of the present disclosure comprises a socket 10, a plug 20 and a DC power line 30.

In particular, the socket 10 is assembled to a power device 300 (shown in FIG. 5) to acquire electricity from the power device 300. The socket 10 includes a first housing 100 and a first contact group 11 mounted to the first housing 100.

That is to say, during using the charger in actual, the socket 10 is assembled to the power device such as the socket 10 is embedded in the power device 300, plugged in the power device 300 or integrated with the power device 300. The power device 300 may be a power adapter, a power strip, a plug or a host power of a computer, etc.

It's needed to say, the configuration and the shape of the socket 10 may be not limited to the present disclosure. The socket 10 is designed as a carrier of the first contact group 11 as long as the first contact group 11 may be mounted to the socket 10. Preferably, the socket 10 is plastic material.

The plug 20 includes a second housing 200 and a second contact group 21 mounted to the second housing 200. The second contact group 21 corresponds to the first contact group 11. At least one of the first and second contact groups 11, 21 is magnetic so that the first contact group 11 may attract to the second contact group 21. The plug. 20 acquires the electrical energy transmitted from the socket 10 when the first contact group 11 attracts to the second contact group 21. Preferably, the plug 20 is plastic material.

That is to say, because at least one of the first and second contact groups 11, 21 is agnetic, the first contact group 11 attracts to the second contact group 21 base on magnetic attraction principle. The electrical connection between the socket 10 and the plug 20 is obtained when the first contact group 11 attracts to the second contact group 21, thereby the socket 10 may transmit the electrical energy to the plug 20 through the first contact group 11 to the second contact group 21.

It is understandable, both the first contact group 11 and the second contact group 21 include positive contacts and negative contacts. The positive contact and the negative contact of the first contact group 11 respectively attract to the corresponding positive contact and negative contact of the second contact group 21, thus the electrical connection between the first contact group 11 and the second contact group 21 is obtained.

Figure 5:
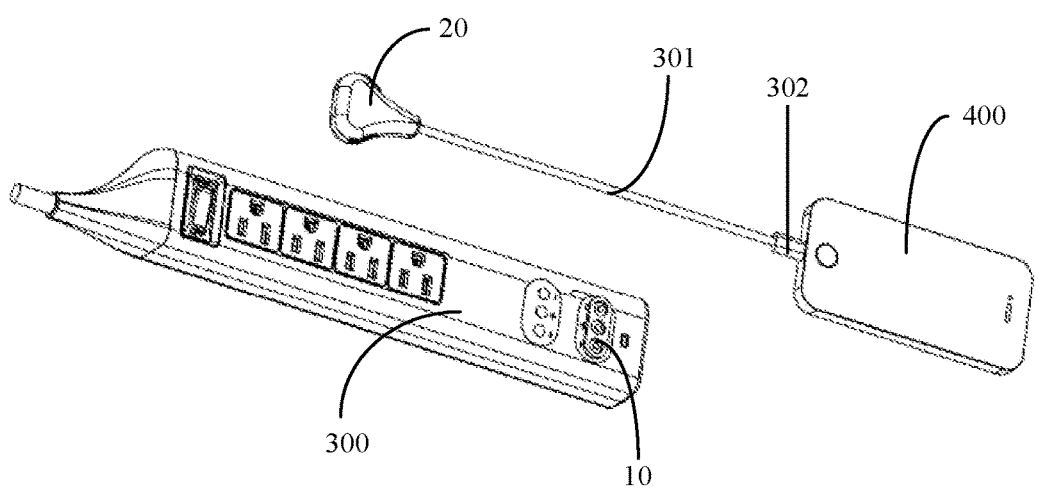
FIG. 5 is a schematic view of an electrical connection device with the smart switching charger in accordance with an exemplary embodiment.

The DC power line 30 connects with the plug 20 for transmitting the electrical energy to an electrical device 400 (shown in FIG. 5). That is to say, when the first contact group 11 of the socket 10 attracts to the second contact group 21 of the plug 20, the electrical energy of the socket 10 is transmitted from the first contact group 11 to the second contact group 21, and then transmitted from the second contact group 21 to the DC power line 30, finally, the electrical energy is transmitted from the DC power line 30 to the electrical device 400.

In specific usage, first, the DC power line 30 may connect with the electrical device 400, such as mobile phones, and the power device 300 connects to the external alternating current power supply (not shown). At this time, the power device 300 may convert alternating current to direct current and then transmit to the socket 10. Second, the second contact group 21 of the plug 20 attracts to the first contact group 11 of the socket 10, the electrical connection between the first contact group 11 and the second contact group 21 is obtained. The direct current of the socket 10 may be transmitted to the plug 20 and then transmit to the electrical device 400 from the DC power line 30 connected to the plug 20, thereby the electrical device 400 may be charged by the smart switching charger.

The smart switching charger according to the embodiment of the present disclosure, the first contact group 11 is defined on the socket 10, and the second contact group 21 is defined on the plug 20 for attracting to the corresponding first contact group 11. The plug 20 acquires the electrical energy transmitted from the socket 10 when the first contact group 11 attracts to the second contact group 21. Thus, during using the smart switching charger, the second contact group 21 of the plug 20 attracts to the first contact group 11 of the socket 10, and then the DC power line 30 is connected with the electrical device 400 to charge the electrical device 400. Such configuration may obtain a reliable electrical connection between the socket 10 and the plug 20 via the magnetic adsorption. A simple and convenient operation of connecting the socket 10 and the plug 20 is obtained, and lifespan of the smart switching charger is improved.

It is emphasizing that, as is known to all, the power device 300 such as the power adapter, the power outlet and the host power of the computer, without exception, define a USB port to electrically connect with a USB plug of a data line for acquiring electricity from the USB port to charge the electrical device 400. That is to say, a user is able to utilize the USB port of the power device 300 insertion with the USB plug to charge the electrical device 400. So, the operation for users is very fussy. Additionally, such type insertion may easily cause poor connection between the USB plug of the data line and the USB port, even damage the USB plug of the data line or the USB port, due to the influential factors such as the strength, angle or frequency of insertion, etc.

The first contact group 11 of the socket 10 and the second contact group 21 of the plug 20 may attract to each other. When the socket 10 is close to connect with the plug 20, the reliable electrical connection between the socket 10 and the plug 20 is obtained because the socket 10 may accurately attract to the plug 20. So, the operation is very simple and convenient. Furthermore, the first contact group 11 and/or the second contact group 21 is magnetism, thereby the accurate and reliable connection between the first contact group 11 and the second contact group 21 is obtained because the accurate attraction formed therebetween. Such electrical connection is stable and reliable and the lifespan is greatly improved as long as the magnetism of the first contact group 11 and/or the second contact group 21 is existed.

Figure 2:
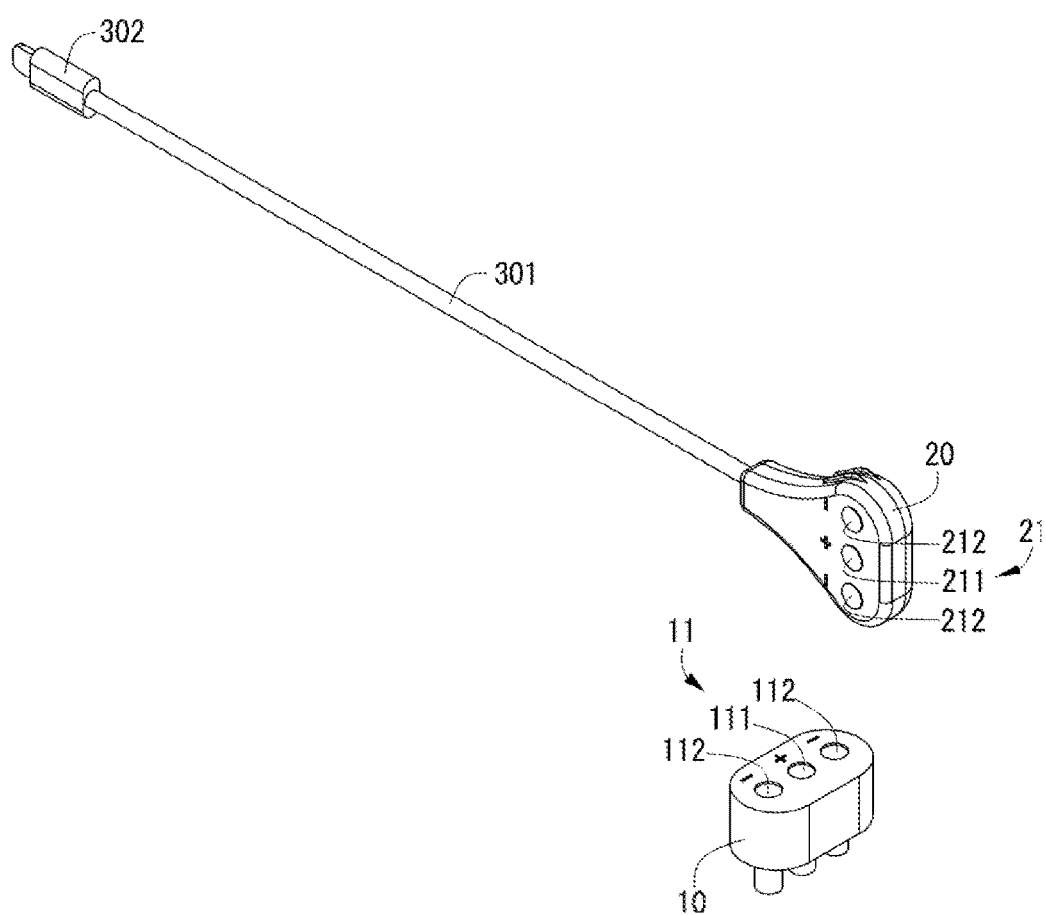
FIG. 2 is an exploded schematic view of the smart switching charger of FIG. 1.
Figure 3:
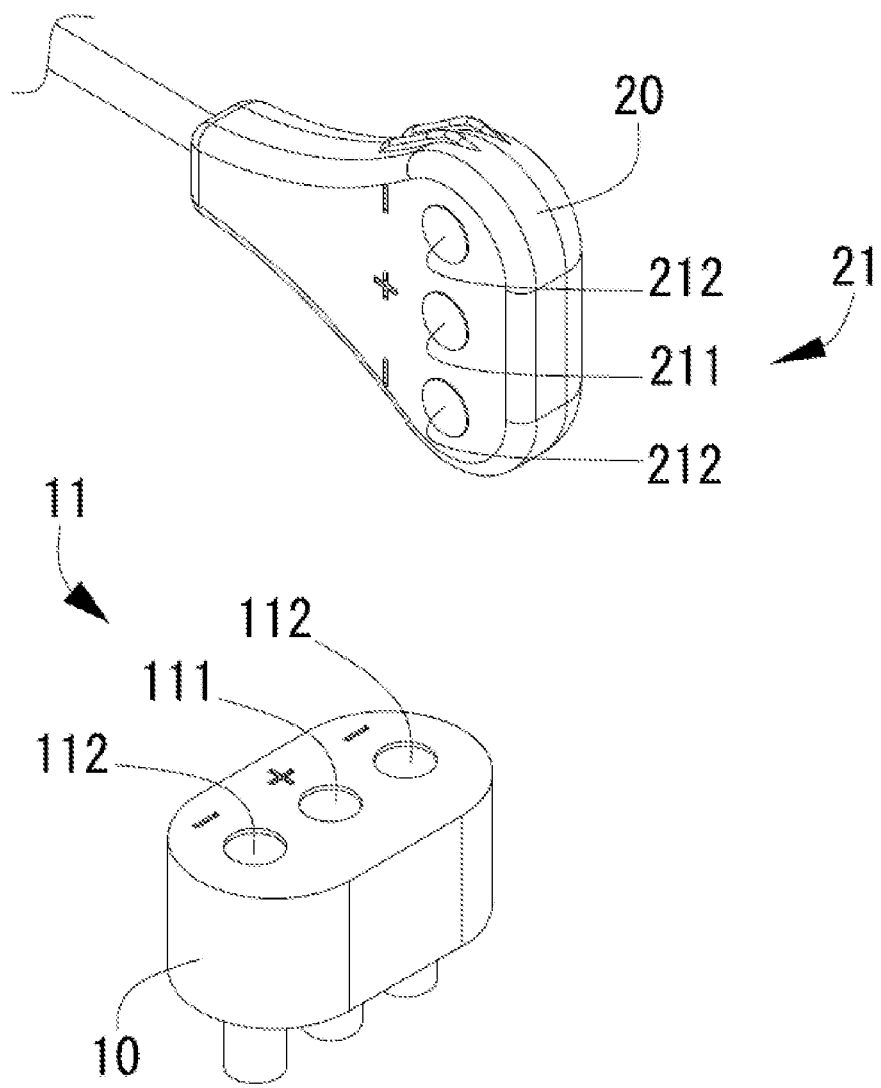
FIG. 3 is a schematic view of a plug and a socket of the smart switching charger of FIG. 1.

Referring to FIGS. 2 & 3, in an embodiment of the present disclosure, the first housing 100 of the socket 10 includes a top surface 101, the first contact group 11 is formed on the top surface 101. The second housing 200 of the plug 20 includes a bottom surface 201 matched with the top surface 101, the second contact group 21 is formed on the bottom surface 201.

When the second contact group 21 attracts to the first contact group 11, the bottom surface 201 is opposite or attached to the top surface 101 from top to bottom, thereby the first contact group 11 and the second contact group 21 may be enclosed between the socket 10 and the plug 20 to protect the first contact group 11 and the second contact group 21 from polluting and damaging due to barely expose outside. Simultaneously, the configuration may improve the security to use of the smart switching charger.

It can be understood that the first contact group 11 may be formed on other surfaces such as a first side surface of the socket 10. Correspondingly, the second contact group 21 may be formed on other corresponding surface such as a second side surface of the plug 20, the first side surface corresponds to the second side surface. Thus, the first side surface of the socket 10 is opposite or attached to the second side surface of the plug 20 from left to right.

In an exemplary embodiment of the present disclosure, both the top surface and the bottom surface are plane. That is, both the surface of the first contact group 11 and the surface of the second contact group 21 are flat surface. The two opposite flat surfaces are attracted to each other when the first contact group 11 attracting to the second contact group 21, thereby the top surface of the socket 10 is completely attracted to the bottom surface of the plug 20. At the same time, the first contact group 11 and the second contact group 21 are better protected, the electrical connection between the first contact group 11 and the second contact group 21 is more reliable.

Referring to FIG. 3, more favorably, in an exemplary embodiment of the present disclosure, the first contact group 11 is lower than the top surface, and the second contact group 21 is higher than the bottom surface. Such as, the first housing 100 of the socket 10 includes a recess (not labeled) formed on the top surface 101. The first contact group 11 is received in the recess so as to the first contact group 11 slightly lower than the recess. The shape of the recess is better to correspond to the shape of the first contact group 11. Both the first contact group 11 and the recess are circular (shown in FIG. 2), accordingly, the second contact group 21 is slightly higher than the bottom surface of the plug 20.

During use of the smart switching charger, when the first contact group 11 of the socket 10 attracts together with the second contact group 21 of the plug 20, the second contact group 21 is received in the recess. At the same time, because the recess has a certain depth, the first contact group 11 is located in the recess without sliding out from the recess along a horizontal direction. That is, the reliable electrical connection between the first contact group 11 and the second contact group 21 is ensured, and disconnection of the first contact group 11 and the second contact group 21 is avoided due to influence of external forces.

Referring to FIGS. 2&3, in a preferred embodiment of the present disclosure, the first contact group 11 includes a positive contact 111 and at least two negative contacts 112, the at least two negative contacts 112 formed around the first positive contact 111. Correspondingly, the second contact group 21 includes a second positive contact 211 attracting to the first positive contact 111, and at least two second negative contacts 212 respectively attracting to the corresponding at least two first negative contacts 112. The at least two second negative contacts 212 are formed around the second positive contact 211. That is to say, the first contact group 11 includes a plurality of first negative contacts 112. Correspondingly, the second contact group 12 also includes a plurality of second negative contacts 212. The plurality of first negative contacts 112 is one-to-one corresponding to the plurality of second negative contacts 212.

In the process of usage, the plurality of first negative contacts 112 is positioned around the first positive contact 111, and the plurality of second negative contacts 212 is positioned around the second positive contact 211. Thus, users need not to distinguish and align with the positive and the negative of the socket 10 and the plug 20. As long as the socket 10 is optionally close to the plug 20, the first positive contact 111 of the socket 10 may accurately attract to the second positive contact 211, and each of the first negative contacts 112 of the socket 10 may also accurately attract to the corresponding second negative contacts 212, thereby, the reliable electrical connection between the socket 10 and the plug 20 is obtained. Such usage is not only convenient and quick, but also meet humanization requirement.

In an exemplary embodiment of the present disclosure, the plurality of first negative contacts 112 is two. The two first negative contacts 112 are symmetrically arranged on two opposite sides of the first positive contact 111. Correspondingly, the plurality of the second negative contacts 212 is also two. The two second negative contacts 212 are also symmetrically arranged on two opposite sides of the second positive contact 211. Thus, when the socket 10 connecting with the plug 20, the plug 20 may be easily placed on the socket 10 to electrically connect with the socket 10 without needing to distinguish the positive and the negative of the socket 10 and the plug 20.

Figure 4:
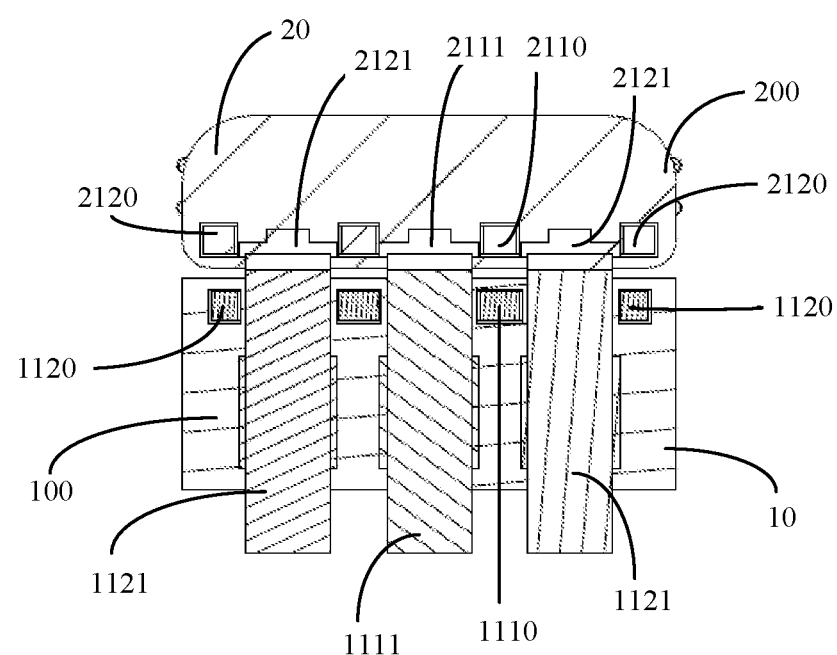
FIG. 4 is a cross-sectional schematic assembly view of the plug and the socket of the smart switching charger of FIG. 1.

Referring to FIG. 4, in an exemplary embodiment of the present disclosure, the first positive contact 111 includes a first magnetic piece 1110 embedded in the socket 10 and a first positive pad 1111 covered around the first magnetic piece 1110. The first negative contact 112 includes a second magnetic piece 1120 embedded in the socket 10 and a first negative pad 1121 covered around the second magnetic piece 1120. While the second positive contact 211 includes a third magnetic piece 2110 embedded in the plug 20 and a second positive pad 2111 covered around the third magnetic piece 2110. The second negative contact 212 includes a fourth magnetic piece 2120 embedded in the plug 20 and a second negative pad 2121 covered around the fourth magnetic piece 2120. That is, in the embodiment of the present disclosure, both the first contact group 11 and the second contact group 21 are magnetic configuration. Each contact includes a magnetic piece and a pad. So, when the socket 10 connects with the plug 20, each contact of the first contact group 11 tightly and reliably connects with the corresponding contact of the second contact group 21 to obtain a more reliable electrical connection therebetween.

It's understandable, the first magnetic piece 1110 and the second magnetic piece 1120 may be detachable to each other or integrated with each other as long as the first magnetic piece 1110 is not mutually exclusive to the second magnetic piece 1120. In the same way, the third magnetic piece 2110 and the fourth magnetic piece 2120 may be detachable to each other or integrated with each other as long as the third magnetic piece 2110 is not mutually exclusive to the fourth magnetic piece 2120. In the present disclosure, the first magnetic piece 1110 is integrated with the second magnetic piece 1120, and the third magnetic piece 2110 is integrated with the fourth magnetic piece 2120.

In an exemplary embodiment of the present disclosure, the DC power line 30 includes a body 301 and a power plug 302. One end of the body 301 connects to the plug 20 and the other end of the body 301 connects to the power plug 302. Another end of the power plug 302 connects with a charging port of the electrical device 400. This way, the power plug 302 may be easily connected to the charging port of the electrical device 400 for charging the electrical device 400. It's understandable that the power plug 302 may be selected according to different electrical devices if only it is matched with the charging port of the electrical device.

In an exemplary embodiment of the present disclosure, the first contact group 11 and/or the second contact group 21 are elastic elements. That is, the first positive contact 111 and the first negative contacts 112 are elastic, and/or the second positive contact 211 and the second negative contacts 212 are also elastic. Such as, adding a spring configuration, first, the magnetic piece is placed on the spring, and then the positive pad or the negative pad is positioned on the magnetic piece, thereby, the elastic positive pad or the elastic negative pad is obtained.

Additionally, because at least one of the first positive contact 111 and the second positive contact 211 is elastic, and at least one of the first and second negative contacts 112, 212 is also elastic. When the first positive contact 111 and the first negative contacts 112 respectively attract to the corresponding second positive contact 211 and the second negative contacts 212, the good connection between the first positive contact 111 and the second positive contact 211, and the good connection between the first negative contact 112 and the second negative contact 212, may be ensured and protected from disconnection due to external vibration. That is, the reliability of the electrical connection between the socket 10 and the plug 20 may be improved.

Referring to FIG. 5, an exemplary embodiment of the present disclosure also provides a power connection device which includes a power device 300 and a smart switching charger described above mentioned. The power device 300 is configured for converting alternating current to direct current. The power device 300 may be selected from a power adapter, a power outlet, a plug or a host power of a computer, etc. The socket 10 is assembled to the power device 300.

The power connection device according to an exemplary embodiment of the present disclosure, includes the smart switching charger mentioned above. The socket 10 includes the first contact group 11 and the plug 20 includes the second contact group 21 to attract to the corresponding first contact group 11. The plug 20 acquires the electrical energy transmitted from the socket 10 when the first contact group 11 attracts to the second contact group 21. Thus, during use of the smart switching charger, the second contact group 21 of the plug 20 attracts to the first contact group 11 of the socket 10, and then the DC power line 30 is connected with the electrical device for charging the electrical device. Such configuration may obtain a reliable electrical connection between the socket 10 and the plug 20 through the magnetic adsorption. A simple and convenient operation of connecting the socket and the plug is obtained, and lifespan of the smart switching charger is improved.

In the description of the specification of the present disclosure, the terms such as "an embodiment", "some embodiments", "an example", "specific examples" and "some examples", etc, are described in the specification of the present disclosure. Such description is referred to the specific characteristics, configurations, materials, or features, combined with the description of the embodiment or the example, which are included in the at least one embodiment or one example of the present disclosure. In the specification of the present disclosure, the schematic description of the terms mentioned above does not necessarily refer to the same embodiment or example. Furthermore, the specific characteristics, configurations, materials, or features of the description may be combined in any one or more embodiments or examples with a appropriate ways.

Although the features and elements of the present disclosure are described as embodiments in particular combinations, each feature or element can be used alone or in other various combinations within the principles of the present disclosure to the fill extent indicated by the broad general meaning of the terms in which the appended claims are expressed.

What is claimed is:

1. A smart switching charger comprising:
   a socket assembled to a power device to acquire electricity from the power device and comprising a first contact group;
   a plug comprising a second contact group corresponding to the first contact group, wherein at least one of the first and second contact groups is magnetic so that the first contact group may attract to the second contact group, the plug acquires the electrical energy transmitted from the socket when the first contact group attracts to the second contact group;
   a DC power line connected with the plug for transmitting the electrical energy to an electrical device.

2. The smart switching charger as claimed in claim 1, wherein the socket comprises a first housing defining a top surface, the first contact group is formed on the top surface, the plug comprises a second housing defining a bottom surface matched with the top surface, the second contact group is formed on the bottom surface.

3. The smart switching charger as claimed in claim 2, wherein both the top surface and the bottom surface are plane.

4. The smart switching charger as claimed in claim 2, wherein the first contact group is lower than the top surface, and the second contact group is higher than the bottom surface.

5. The smart switching charger as claimed in claim 1, wherein the first contact group comprises a first positive contact and at least two first negative contacts formed around the first positive contact; the second contact group comprises a second positive contact attracting to the first positive contact, and at least two second negative contacts respectively attracting to the corresponding at least two first negative contacts, the at least two second negative contacts are formed around the second positive contact.

6. The smart switching charger as claimed in claim 5, wherein the amount of the first negative contact is two, the two first negative contacts are symmetrically arranged on two opposite sides of the first positive contact; while the amount of the second negative contact is two, the two second negative contacts are symmetrically arranged on two opposite sides of the second positive contact.

7. The smart switching charger as claimed in claim 5, wherein the first positive contact comprises a first magnetic piece embedded in the socket and a first positive pad covered around the first magnetic piece; the first negative contact comprises a second magnetic piece embedded in the socket and a first negative pad covered around the second magnetic piece; while the second positive contact comprises a third magnetic piece embedded in the plug and a second positive pad covered around the third magnetic piece; the second negative contact comprises a fourth magnetic piece embedded in the plug and a second negative pad covered around the fourth magnetic piece.

8. The smart switching charger as claimed in claim 1, wherein the DC power line comprises a body and a power plug, one end of the body connects to the plug and the other end of the body connects to the power plug, the power plug connects with a charging poll of the electrical device.

9. The smart switching charger as claimed in claim 1, wherein the first contact group and/or the second contact group are elastic elements.

10. A power connection device comprising:
    a power device configured for converting alternating current to direct current;
    a smart switching charger comprising:
    a socket assembled to the power device to acquire electricity from the power device and comprising a first contact group;
    a plug comprising a second contact group corresponding to the first contact group, wherein at least one of the first and second contact groups is magnetic so that the first contact group may attract to the second contact group, the plug acquires the electrical energy transmitted from the socket when the first contact group attracts to the second contact group;
    a DC power line connected with the plug for transmitting the electrical energy to an electrical device.

11. The power connection device as claimed in claim 10, wherein the socket comprises a first housing defining a top surface, the first contact group is formed on the top surface, the plug comprises a second housing defining a bottom surface matched with the top surface, the second contact group is formed on the bottom surface.

12. The power connection device as claimed in claim 11, wherein both the top surface and the bottom surface are plane.

13. The power connection device as claimed in claim 11, wherein the first contact group is lower than the top surface, and the second contact group is higher than the bottom surface.

14. The power connection device as claimed in claim 11, wherein the first contact group comprises a first positive contact and at least two first negative contacts formed around the first positive contact; the second contact group comprises a second positive contact attracting to the first positive contact, and at least two second negative contacts respectively attracting to the corresponding at least two first negative contacts, the at least two second negative contacts are formed around the second positive contact.

15. The power connection device as claimed in claim 14, wherein the amount of the first negative contact is two, the two first negative contacts are symmetrically arranged on two opposite sides of the first positive contact; while the amount of the second negative contact is two, the two second negative contacts are symmetrically arranged on two opposite sides of the second positive contact.

16. The power connection device as claimed in claim 14, wherein the first positive contact comprises a first magnetic piece embedded in the socket and a first positive pad covered around the first magnetic piece; the first negative contact comprises a second magnetic piece embedded in the socket and a first negative pad covered around the second magnetic piece; while the second positive contact comprises a third magnetic piece embedded in the plug and a second positive pad covered around the third magnetic piece; the second negative contact comprises a fourth magnetic piece embedded in the plug and a second negative pad covered around the fourth magnetic piece.

17. The power connection device as claimed in claim 10, wherein the DC power line comprises a body and a power plug, one end of the body connects to the plug and the other end of the body connects to the power plug, the power plug connects with a charging port of the electrical device.

18. The power connection device as claimed in claim 10, wherein the first contact group and/or the second contact group are elastic elements.

* * * * *